US012192297B2

(12) United States Patent
Ranjan et al.

(10) Patent No.: US 12,192,297 B2
(45) Date of Patent: Jan. 7, 2025

(54) REAL-TIME SUGGESTED ACTIONS BASED ON USER PROFILE ATTRIBUTES

(71) Applicant: PAYPAL, INC., San Jose, CA (US)

(72) Inventors: Sumit Ranjan, San Jose, CA (US); Sriram Ramakrishnan, Milpitas, CA (US); Ravi Shankar Chandrasekaran, Milpitas, CA (US); Dinesh Damodharan, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 12 days.

(21) Appl. No.: 17/853,322

(22) Filed: Jun. 29, 2022

(65) Prior Publication Data

US 2022/0407936 A1 Dec. 22, 2022

Related U.S. Application Data

(63) Continuation of application No. 16/457,715, filed on Jun. 28, 2019, now Pat. No. 11,381,652.

(51) Int. Cl.
*H04L 67/50* (2022.01)
*G06F 9/451* (2018.01)
(Continued)

(52) U.S. Cl.
CPC ............ *H04L 67/535* (2022.05); *G06F 9/453* (2018.02); *G06F 16/955* (2019.01); *G06N 20/00* (2019.01); *H04L 67/306* (2013.01)

(58) Field of Classification Search
CPC ..... H04L 67/535; H04L 67/306; G06F 9/453; G06F 16/955; G06F 16/9535;
(Continued)

(56) References Cited

U.S. PATENT DOCUMENTS 8,423,577 B1 4/2013 Lee et al.
10,990,980 B1 * 4/2021 Reses ................. G06Q 40/12
(Continued)

OTHER PUBLICATIONS

Grover P., "Gradient Boosting from Scratch", ML Review—Medium, Dec. 8, 2017, https://medium.com/mlreview/gradient-boosting-from-scratch1e317ae4587d, 18 pages.
(Continued)

*Primary Examiner* — Chirag R Patel
(74) *Attorney, Agent, or Firm* — Kowert, Hood, Munyon, Rankin & Goetzel, P.C.

(57) ABSTRACT

Techniques are disclosed relating to generating real-time suggested actions for a user based on their user profile attributes. In various embodiments, a server system may select, in real-time, a particular action to suggest to a user based on profile attributes associated with a user account of the user. The server system may then provide a message indicative of this particular action to a user device associated with the user. In some embodiments, the server system may then receive an indication that the user has initiated the particular action. In response to this indication, the server system may update the profile attributes associated with the user account to indicate that the user has initiated the particular action. Using these updated profile attributes, the server system may then select, in real-time, an updated action to suggest to the user that is different from the particular action.

20 Claims, 6 Drawing Sheets

(51) Int. Cl.
*G06F 16/955* (2019.01)
*G06N 20/00* (2019.01)
*H04L 67/306* (2022.01)

(58) Field of Classification Search
CPC .......... G06N 20/00; G06N 5/01; G06N 20/10; G06N 20/20; G06N 5/04; G06N 3/08; G06N 3/044
USPC .................................................. 709/224–225
See application file for complete search history.

(56) References Cited

U.S. PATENT DOCUMENTS

| | | |
|---|---|---|
| 2006/0259479 A1 | 11/2006 | Dai |
| 2009/0094535 A1 | 4/2009 | Bromenshenkel et al. |
| 2013/0104058 A1* | 4/2013 | Bromenshenkel .. G06F 3/04815 715/757 |
| 2014/0089320 A1 | 3/2014 | Baldwin et al. |
| 2016/0057179 A1 | 2/2016 | Volach |
| 2016/0239848 A1* | 8/2016 | Chang .................. G06Q 30/016 |
| 2016/0294952 A1* | 10/2016 | Bodell .................. H04L 51/046 |
| 2019/0394511 A1* | 12/2019 | Kalaboukis ...... H04N 21/25891 |
| 2020/0033144 A1 | 1/2020 | Du et al. |
| 2020/0348802 A1 | 11/2020 | Brito et al. |

OTHER PUBLICATIONS

"How do Recommendation Engines work? And What are the Benefits?", Jul. 9, 2019, https://www.marutitech.com/recommedation-engine-benefits/, 17 pages.
International Preliminary Report on Patentability for Application No. PCT/US2020/039851 mailed on Jan. 6, 2022, 9 pages.
International Search Report and Written Opinion in PCT Application No. PCT/US2020/039851 mailed Sep. 3, 2020, 16 pages.
Konstan J.A et al. "Recommender systems: from algorithms to user experience." In: User modeling and user-adapted interaction, Mar. 10, 2012 (Mar. 10, 2012) Retrieved on Aug. 19, 2020 (Aug. 19, 2020) from https://link.springer.com/content/pdf/10.1007/s11257-011-9112-x.pdf, entire document, 23 pages.

* cited by examiner

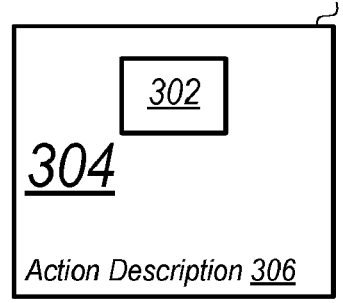
FIG. 3A
FIG. 3B

400

402
Access a set of potential actions to suggest to the user

404
Apply eligibility rules, based on real-time profile attributes associated with the user account, to identify a subset of potential actions that are relevant to the user

406
From the subset of potential actions, select a particular action to suggest to the user

408
Select a presentation format in which the particular action will be presented to the user

410
Send a suggestion message to the user device that will enable the particular action to be suggested to the user using the selected presentation format

502
Select, in real-time, a particular action to suggest to a user, where the particular action is selected using profile attribute information associated with a user account of the user

504
Provide the particular action to a user device associated with the user

506
Receive an indication that the user has initiated the particular action

508
Update the profile attributes associated with the user account to generate updated profile attributes, where the updated profile attributes indicate that the user has initiated the particular action

510
Based on the updated profile attributes, select, in real-time, an updated action to suggest to the user

FIG. 5

REAL-TIME SUGGESTED ACTIONS BASED ON USER PROFILE ATTRIBUTES

CROSS-REFERENCE TO RELATED APPLICATION

This application is a continuation of U.S. patent application Ser. No. 16/457,715, filed Jun. 28, 2019, which is incorporated by reference in its entirety.

BACKGROUND

Technical Field

This disclosure relates generally to suggestion systems and, more particularly, to generating real-time suggested actions for a user based on profile attributes associated with their user account.

Description of the Related Art

Server systems, such as web servers, application servers, email servers, etc., may provide various computing resources and services to an end user. For example, a web service may use one or more server systems to provide access to software applications to various remote users via a network. In some instances, it may be desirable to provide the user with suggested actions that the user could take via the web service. For example, in some instances, there may be certain actions that the user could take that would improve the quality of their user experience or would improve security for their user account.

BRIEF DESCRIPTION OF THE DRAWINGS

FIG. 3A depicts example message templates that may be used to present a suggested action to a user, according to some embodiments.

FIG. 3B depicts example messages that may be provided to a user to suggest a particular action, according to some embodiments.

FIG. 4 is a flow diagram illustrating an example method for generating a real-time suggested action for a user based on current profile attributes, according to some embodiments.

FIG. 5 is a flow diagram illustrating an example method for selecting, in real-time, an updated suggested action for a user in response to an indication that the user has initiated a previously suggested action, according to some embodiments.

DETAILED DESCRIPTION

As noted above, it may be desirable to provide the user of a web service with suggested actions that, if taken, would improve the quality or security of the service. For example, in some instances, it may be desirable to recommend that the user verify a mobile phone number associated with the user account, which would help facilitate multi-factor authentication and improve the security of the user's account. Additionally, in many instances, it may be desirable to select a suggested action to send to a user based on a current state of the profile attributes associated with the user's account. For example, suggesting actions that are relevant to recent user activity may increase the likelihood that the user will find the suggested action useful, increasing the level of user engagement with the service and reducing the chance that duplicative or "outdated" suggestions will be sent to the user. In various embodiments, the disclosed systems and methods are operable to select real-time suggested actions for a user based on the user's profile attributes. For example, in some embodiments, the disclosed systems may access a database that includes profile attributes associated with the user account and are indicative of recent user activity, determine a priority score for one or more of these potential actions, and, select an action to suggest to the user based on these priority scores.

Figure 1:
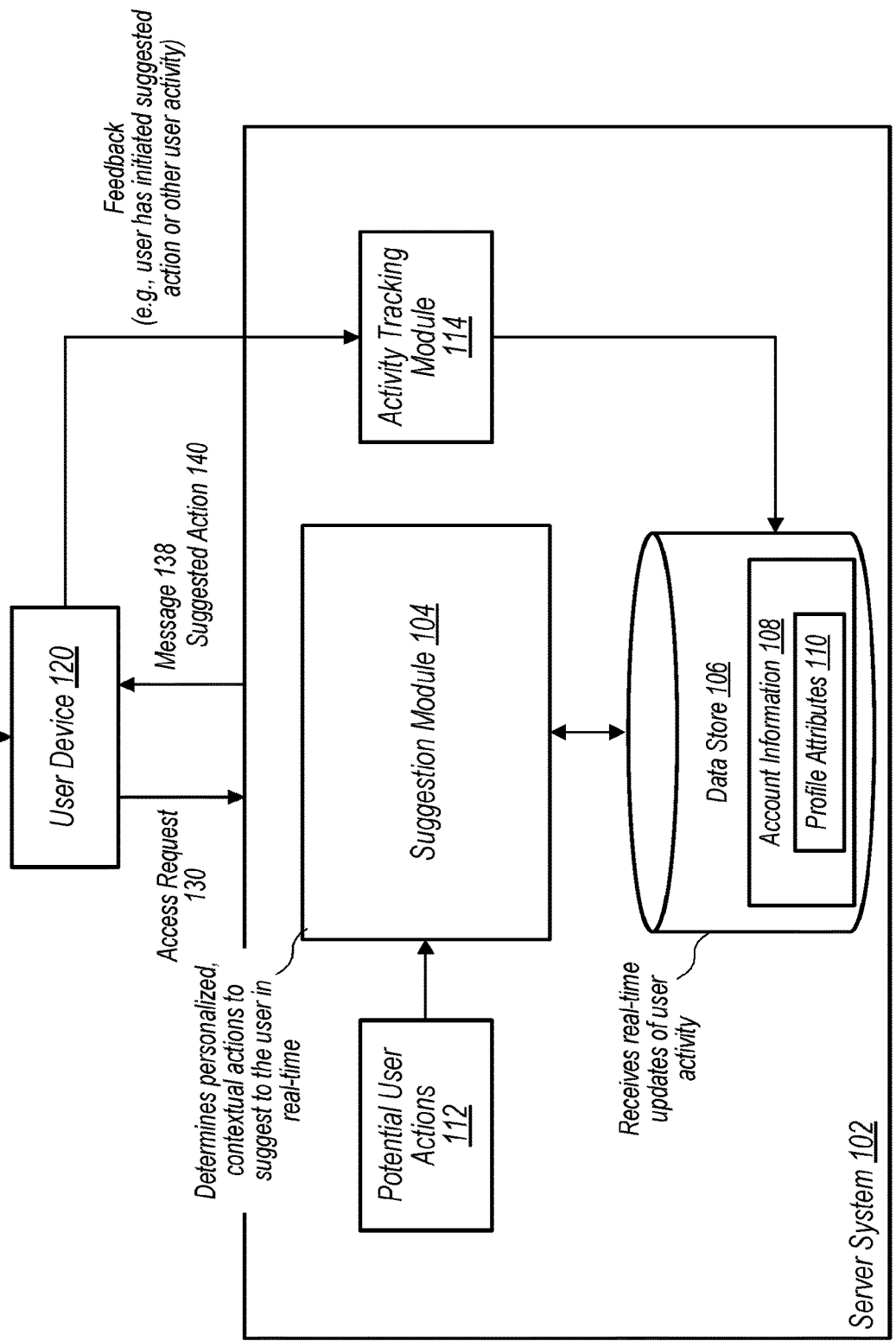
FIG. 1 is a block diagram illustrating an example system for generating real-time suggested actions for a user, according to some embodiments.

Referring now to FIG. 1, a block diagram illustrating a system 100 for generating real-time suggested actions for a user is depicted, according to some embodiments. In FIG. 1, system 100 includes server system 102 and user device 120. Note that although shown in direct communication, server system 102 and user device 120 may be connected via one or more communication networks (not shown for clarity).

In various embodiments, server system 102 may host a web service that is accessible to various remote users (such as the user 122 of user device 120) via one or more communication networks. For example, server system 102 may host an email service, a streaming media service, an online payment service, or any other suitable web service, according to various embodiments. (Note that, in FIG. 1, portions of the server system 102 associated with providing the web service (e.g., HTTP servers, application servers, etc.) are not specifically shown, for clarity.) As part of its web service, server system 102 may provide users with access to various functionalities and computing resources. In instances in which the server system 102 host an online payment system, as one nonlimiting example, the web service may enable an authorized user to perform various financial operations such as transferring money, accessing financial information, etc.

In various instances, it may be desirable to provide the user with suggested actions that he or she could take via the web service. For example, in some instances, there are certain actions that the user could take that would improve the quality of their user experience with the web service or would enable a greater range of functionality via the service. Continuing with the example above, for instance, in which the server system 102 provides an online payment service, one potential action that could be suggested to a user is to link the user's account with the online payment service to a financial transaction instrument, such as a credit or debit card. In some such embodiments, doing so may enable the user to perform a greater range of functions via the online payment service, such as facilitating transactions via the linked credit or debit card, thereby improving the user's experience. In other embodiments, there may be certain actions that the user could take that would improve the security of the user's account. For example, in some instances it may be desirable for the user to link their mobile device or email address with their user account such that, in the event of an account takeover, the user may regain control of their account. Further still, in some embodiments, there may be certain frequently performed actions that may be suggested to the user in an effort to increase convenience associated with the web service. For example, in keeping with the running example above, a user of the online payment service may routinely perform various financial operations via the service, such as depositing paychecks biweekly, sending money to a gym trainer at the beginning of every month, or transferring money to a known contact. In such instances, proactively suggesting one or more of these actions (e.g., by sending a suggestion message to the user's device) may make it more convenient for the user to perform these actions.

In various embodiments, the disclosed systems and methods select suggested actions for users. As used herein, selecting an action to suggest to a user in "real-time" refers to performing the selection of the action within one second following a triggering event (e.g., receiving an access request from the user). Further, as disclosed herein, a suggested action may be based on a current state of one or more profile attributes associated with a user account of the user (that is, based on updated profile attributes associated with the user account of the user). Continuing with the example above, consider an instance in which the user logs into and sends a request to access an online payment service provided by server system 102. In some such embodiments, in response to this access request, the disclosed systems may analyze current profile attributes associated with the user's account and select "verify a mobile phone number for use in two-factor authentication" as the action to suggest to the user, as this action serves to improve security for the user account. Server system 102 may then provide the suggestion to the user (e.g., as a message card displayed via a client application on the user device 120). If the user then takes the suggested action and verifies his or her mobile phone number, the server system 102 may receive an indication of this event and update the profile attributes associated with the user 122's user account to reflect that the user has verified his or her mobile phone number. In various embodiments, the disclosed system may then select a new action to suggest to the user in real-time, by performing the selection of the new action within a one-second time period of the triggering event (e.g., receiving an indication that the user has verified his or her mobile phone number). Additionally, while performing the selection, the disclosed techniques select this new action based on the current state of the profile attributes associated with the user's account. Note that, in some embodiments, the disclosed systems and methods may select suggested actions to provide to the user within shorter time periods. For example, in various embodiments, the disclosed systems and methods may select a suggested action in less than 300 ms, 500 ms, etc. By suggesting actions based on updated profile attributes (i.e., the most recent information available to the system), this may increase the likelihood that the user will find the suggested actions useful, and may thus increase user engagement with the system. Selecting suggested user actions in real-time based on updated profile attributes may be particularly useful if a recent action is part of a string of actions, in which the selection of a first suggested action greatly increases the chances that a user should take a second, related action. Non-limiting examples of such actions include "create a money pool," "create a savings goal," "send money abroad," etc.

The notion of a system that "selects an action to suggest to a user in real-time based on updated profile attributes" thus stands in distinction to a hypothetical system that suggests actions to a user based on stale data associated with the user's past behavior. Such a hypothetical system would present various technical shortcomings. For instance, such a system might generate its suggestions in a "computed" or "off-line" manner in which a suggested action for the user is selected based on an analysis of profile attributes of the user's account that are not current and, as such, fail to reflect recent account activity. Stated differently, there might be significant latency (e.g., an hour, 24 hours, etc.) from the time that activity associated with a user account is performed and the time that the suggestion engine would take that activity into consideration as part of the suggestion process. Accordingly, such a hypothetical suggestion engine would not be considered to select suggested actions based on updated profile attributes. This technical shortcoming presents various problems. For instance, in the example in the preceding paragraph, the disclosed system provides a selected action to the user 122 (e.g., "verify a mobile phone number for use in two-factor authentication"), receives an indication that the user has performed that suggested action, and, in real-time, selects a new action to suggest to the user. Using a hypothetical suggestion engine that does not select a suggested action in real-time and based on a current state of profile attributes associated with the user's account, however, may result in the same action (e.g., "verify a mobile phone number for use in two-factor authentication") being provided to the user twice in a row. As the user has just performed this suggested action, however, receiving the same suggested action again would likely result in user confusion and degrade the overall quality of the user experience. Alternatively, even if the hypothetical system did not select the same action again, the next action selected by such a system would not be selected based on current profile attributes associated with the user's account. That is, by simply providing the next in a series of previously selected actions, prior suggestion systems would not be considered to be selecting suggested actions for the user based on current profile attributes of the user's account.

In FIG. 1, user device 120 sends an access request 130 to the server system 102. For example, the access request 130 may be a request to access one or more services provided by the server system 102. In response to receiving this access request 130, in various embodiments, suggestion module 104 may select, in real-time, one or more relevant, contextual actions to suggest to the user based on current profile attributes associated with the user's account. For example, as shown in FIG. 1, server system 102 includes a set of potential user actions 112 that could be suggested to the user. In some embodiments, this set of potential user actions 112 may be specified by a user (e.g., an administrator) associated with the server system 102 and may include various potential actions that may be performed by, or on behalf of (e.g., by a trusted third-party service), the service provided by server system 102. The nature of the actions included in the set of potential user actions 112 will, of course, vary depending on the nature of the web service provided by the server system 102. For example, in embodiments in which the server system 102 provides an online payment service, the set of potential user actions 112 may include, "confirm a mobile phone number," "confirm an email address," "send money to a contact," "link a financial transaction instrument to user account," "link a bank account to user account," etc. Note that these actions are provided merely as examples and are not intended to limit the scope of the present disclosure. In other embodiments, the set of potential user actions 112 may include any of various suitable actions that may be suggested to a user of the service.

Server system 102 further includes (or has access to) data store 106, which may store account information 108 associated with various user accounts of the server system 102. As shown in FIG. 1, in various embodiments the account information 108 for a given user account includes various profile attributes 110, which may be updated in real-time (e.g., within one second following activity associated with the user account). As will be appreciated by one of skill in the art with the benefit of this disclosure, a "profile attribute" refers to a data field that indicates a feature or characteristic of a user account. In various embodiments, server system 102 may maintain a potentially large number (e.g., 500, 1000, 10,000, etc.) of profile attributes associated with the various user accounts. As non-limiting examples, in embodiments in which server system 102 provides an online payment service, the profile attributes for a given user account may include: whether a transaction instrument has been linked to the account, whether there is a valid cash card associated with the user account, the current state of the mobile phone confirmation, the current state of the email confirmation, the date that the user account was created, the last payment date, time, or amount, etc. Note, however, that this embodiment is provided merely as an example and is not intended to limit the scope of the present disclosure. In other embodiments, server system 102 may maintain any suitable combination of profile attributes for the various user accounts.

In various embodiments, suggestion module 104 may select one or more actions to suggest to the user 122 by using the current profile attributes 110 associated with the user account of the user 122, as described in more detail below with reference to FIG. 2. Once selected, the server system 102 may send a message 138 indicative of the suggested action 140 to the user device 120. The manner in which the suggested action 140 is provided to the user device may vary, according to different embodiments. For example, in various embodiments, server system 102 may select a presentation format for the suggested action 140 based on the access method (also referred to herein as the "touchpoint") used by the user 122 to send the access request 130. As one non-limiting example, consider an instance in which the user 122 sends the access request 130 to the server system 102 via a web browser executing on desktop computer. In such an instance, the suggested action 140 may be provided to the user device 120 as an HTML element that is optimized to display the message 138, with the information about the suggested action 140, on a full-sized web browser (e.g., as opposed to a mobile web browser). As discussed in more detail below with reference to FIG. 3, in some embodiments the message 138 may include a hyperlink that may be selected by the user to quickly initiate the suggested action 140.

In FIG. 1, server system 102 further includes activity tracking module 114, which in various embodiments is operable to monitor user activity associated with various user accounts of the server system 102. For example, activity tracking module 114 may be operable to detect whether the user has initiated the suggested action 140 or performed any of various other types of user activity. In various embodiments, upon detecting activity associated with a user account, the activity tracking module 114 may update, in real-time, account information associated with the user account. In some embodiments, this may include updating profile attributes 110 associated with the user account of user 122 to reflect the recent user activity. Further, in some embodiments, the profile attributes 110 maintained in data store 106 may be updated by other services as activity is performed on behalf of a user account. For example, in some embodiments, the components of server system 102 shown in FIG. 1 may be part of a much larger server-side architecture that includes various different web services. Additionally, in some embodiments, sever system 102 may be operable to securely communicate with third party services that may perform operations associated with user accounts. In various embodiments, these services (both internal to the server system 102 and trusted third-party services in secure communication with the server system 102) may access and update profile attributes 110 directly upon completing an action associated with a user account. For example, in some embodiments, the process of verifying mobile a phone number associated with the user account may be performed by a separate service, which may either be part of server system 102 or may be third-party service. In such embodiments, upon completing this verification process, the mobile phone verifying service may directly access and update the corresponding profile attribute 110 for the user account in real-time. By ensuring that the profile attributes 110 maintained in the data store 106 are updated in real-time and kept current, various disclosed embodiments of the disclosed systems and methods are able select an action to suggest to the user 122 based on recent user activity. In various embodiments, this may allow the suggestion module 104 to selects relevant, contextual, personalized suggestions to provide to the user, thereby improving the user experience and the operation of the server system 102 as a whole.

Figure 2:
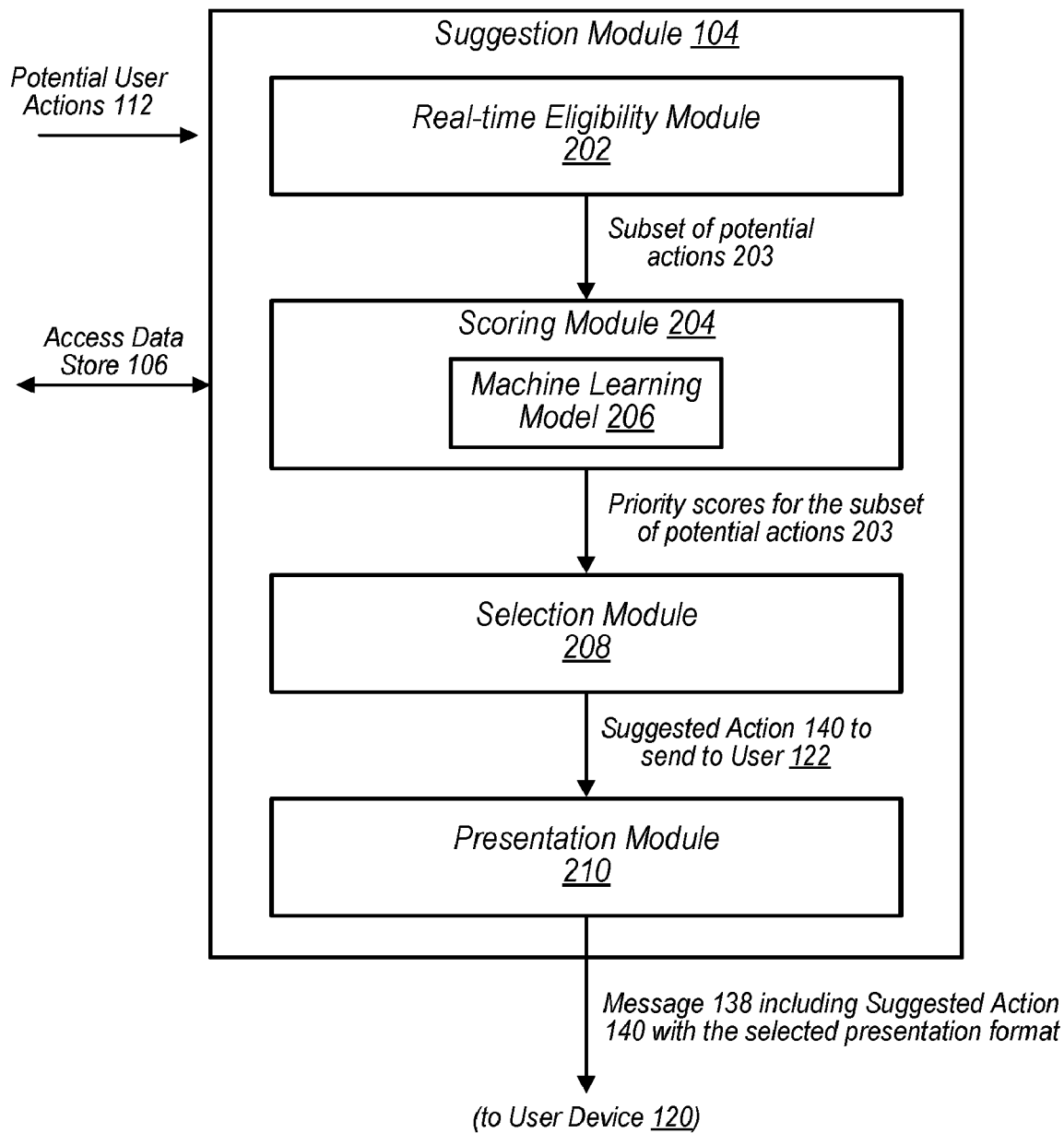
FIG. 2 depicts a block diagram of an example suggestion module, according to some embodiments.

Turning now to FIG. 2, a block diagram of an example suggestion module 104 is shown, according to various embodiments. As noted above, in various embodiments, the suggestion module 104 is operable to select, in real-time, one or more actions to suggest to a user 122 of the service provided by the server system 102.

For example, in the depicted embodiment, suggestion module 104 accesses a set of potential user actions 112 that may be suggested to the user 122. In FIG. 2, suggestion module 104 includes real-time eligibility module 202, which, in various embodiments, is operable to identify a subset of potential actions 203, from the set of potential user actions 112, that are relevant to the user 122. For example, in various embodiments, the real-time eligibility module 202 may access the profile attributes 110 associated with the user account of the user 122. As noted above, in various embodiments these profile attributes 110 are updated in real-time based on activity associated with the user account. In various embodiments, the real-time eligibility module 202 a filter the set of potential user actions 112 based on the profile attributes 110 of the user account to identify the subset of potential actions 203 to suggest to the user 122. For example, in some embodiments, each of the set of potential actions 112 may be associated with an eligibility rule that may be used by the real-time eligibility module 202 to identify the subset of potential actions 203 that are relevant to the user 122. As one non-limiting example, consider an instance in which one of the potential actions, in the set of potential user actions 112, is for the user to verify his or her email address. In some such embodiments, one of the profile attributes maintained for user account of the user 122 may be the status of whether the user has verified an email address associated with their user account. In such an embodiment, real-time eligibility module 202 may determine, based on this profile attribute for the user 122, to filter this potential action from the set of potential user actions 112, thereby removing it as a candidate for selection by the suggestion module 104. Note, however, that this embodiment is provided merely as an example and is not intended to limit the scope of the present disclosure.

Suggestion module 104 further includes scoring module 204, which, in various embodiments, it is operable to determine a priority score for each of the subset of potential actions 203. For example, as shown in FIG. 2, scoring module 204 may access the subset of potential actions 203 that are identified as relevant to the user 122 by the real-time eligibility module 202. In various embodiments, the scoring module 204 may then generate a priority score for each of the subset of potential actions. These priority scores may then be used to rank a relevance of the subset of potential actions 203. As one non-limiting example, in some embodiments the scoring module 204 may generate, for each of the subset of potential actions 203, a score within a specified range (e.g. from 0.0-1.0), with a higher score indicating a higher likelihood that the user will engage with the corresponding action. In this way, the subset of potential actions 203 may be ranked in an order that corresponds to the likelihood that, if suggested to the user 122, the user 122 would engage with the suggested action. Note, however, that this range of potential priority scores is provided merely as an example is not intended to limit the scope of the present disclosure. In other embodiments, any other suitable scoring technique may be used as desired.

The manner in which the scoring module 204 generate the priority scores for the subset of potential actions 203 may vary, according to different embodiments. For example, in the embodiment depicted in FIG. 2, scoring module 204 includes a machine learning model 206. In some such embodiments, the scoring module 204 may use the machine learning model 206 to generate a propensity score for each of the subset of potential actions 203 based on the profile attributes 110 associated with the user 122's user account. Note that, in some embodiments, the machine learning model 206 used to generate the propensity scores for the subset of potential actions 203 may be part of a risk engine used by the server system 102, for example, during user authentication operations. These propensity scores may then be used as the priority scores used to rank the subset of potential actions 203. As used herein, the term "propensity score" refers to a value generated by the machine learning model 206 that indicates the likelihood that a given one of the subset of potential actions 203 will be relevant to the user 122 based on the user's profile attributes 110. Note that, the machine learning model 206 used by the suggestion module 104 may vary, according to different embodiments. In some embodiments, the machine learning model 206 may be an ensemble model that combines multiple machine learning algorithms into a single predictive model in an effort to improve its predictive performance relative to any of the multiple machine learning algorithms alone. As one non-limiting example, in some embodiment, the machine learning model 206 is an ensemble model that is based on a gradient boosted decision tree. Note, however, that this embodiment is provided merely as an example and is not intended to limit the scope of the present disclosure. In other embodiments, for example, the machine learning model 206 may be based on a random forest model, kernel methods, or any other suitable machine learning algorithm.

In other embodiments, rather than generating the priority scores using machine learning model 206, scoring module 204 may instead determine the priority scores based on assigned priority scores associated with each of the subset of potential actions 203. For example, in some such embodiments, a user associated with the server system 102 (e.g., an administrator) may assign, to each of the set of potential user actions 112, one or more corresponding priority scores. In some embodiments, these assigned priority scores may correspond to the relative importance of the actions as determined by the administrator. For example, actions that are deemed to significantly improve the user experience or the security of the user's account may be assigned a relatively high priority score such that they will be more likely to be suggested to a given user. Further, in some embodiments, some of the potential user actions 112 may be assigned multiple different priority scores by the system administrator, which may be used to selectively apply different priority scores for a given action based on the profile attributes 110 of the user 122 for which the action is being selected. In such embodiments, the scoring module 204 may select one of the multiple priority scores for a given action based on the profile attributes 110 associated with the user account.

In the depicted embodiment, suggestion module 104 further includes selection module 208, which, various embodiments, is operable to select a particular one of the subset of potential actions 203 based on their corresponding priority scores, as determined by the scoring module 204. In various embodiments, the selection module 208 may select the action that is deemed to be most relevant to the user 122 as indicated by the priority scores. In embodiments in which a higher priority score corresponds to a higher degree of relevance to the user 122, for example, the selection module 208 may then select the action with the highest priority score. Suggestion module 104 further includes presentation module 210 which, in various embodiments, is operable to select a presentation format to use to present the suggested action 140 to the user 122. In some embodiments, the presentation format is selected based on the access method used by the user 122 to access the server system 102. For example, in various embodiments, the user 122 may be able to access the service provided by server system 102 through various access methods (also referred to herein as "touchpoints"), such as a website accessed using a web browser, a dedicated software application associated with the web service, via a third-party website, etc. In various embodiments, the presentation module 210 may select a presentation format that is most suitable to present the suggested action 140 to the user 122 based on the touchpoint through which the user 122 accessed the service. In some embodiments, for example, presentation module 210 may include (or have access to) a library of message templates that may be used to format a message 138 that is indicative of the suggested action 140. For example, if the user 122 accessed the service via a dedicated software application executing on his or her mobile device, the presentation module 210 may select a presentation format that is compatible with the software application and will present information associated with the suggested action 140 in a manner that is easily viewed and interacted with via the software application. Once it has selected, in real-time, a suggested action 140 and an appropriate presentation format, the suggestion module 104 (or the server system 102) may send the message 138, including the suggested action 140, to the user device 120.

Referring now to FIG. 3A, two example message templates 300 and 310 are depicted, according to some embodiments. In various embodiments, message templates 300 and 310 may correspond to two presentation formats that may be used to present a suggested action 140 to a user 122. For example, as described above, presentation module 210 may select from a library of various message templates, such as message templates 300 and 310, when selecting a presentation format to use to present a suggested action 140 to a user 122.

The presentation format—and, thus, the message template—may be selected by the presentation module 210 based on the access method used by the user 122 to send the access request 130 to the server system 102. For example, in some embodiments, some message templates may be more suitable for display on a webpage that is to be depicted in a desktop browser, some message templates may be more suitable for display on a webpage that is to be depicted on a mobile browser, and some message templates may be more suitable for display via a user interface of a software application executing on a mobile device. In FIG. 3A, for instance, message template 300 represents an elongated HTML element, such as a banner or menu tab, that may be more suitable for display in a desktop web browser. Message template 310, however, represents a "tile" or "card" element that may be more suitable for display in a software application on a mobile device or on a mobile browser.

In FIG. 3A, both message templates 300 and 310 include placeholders for the same items of information. For example, both message templates 300 and 310 include placeholders for an icon 302, an action name 304, and an action description 306. In various embodiments, once a presentation format for the suggested action 140 has been selected, suggestion module 104 may generate the message 138 to populate the appropriate content for the suggested action 140 into the various placeholders within the selected message template. As one non-limiting example, suggestion module 104 may generate the message 138 for the suggested action 140 by populating HTML elements of an HTML file for the message template with the appropriate information for the suggested action 140. For example, in various embodiments the data store that includes the set of potential user actions 112 may also include, for each of the actions, various items of associated information that may be used to populate various message templates, per the selected presentation format, to generate a message 138.

In FIG. 3B, for instance, example messages 320 and 330 are depicted, according to some embodiments. In various embodiments, the messages 320 and 330 are example messages that may be generated using different presentation formats to present the same suggested action 140 (e.g., "confirm your email," in the depicted embodiment) to a user 122. In message 320, message template 300 has been populated with information associated with the selected suggested action 140 to generate a message that may be presented to the user 122. In some embodiments, message 320 may be most suitable for presentation to the user 122 in instances in which the user device 120 is a laptop or desktop computer such that the message 320 may be presented within a webpage displayed via the user device 120 (e.g., as a tab element within a "Suggested Actions" menu). Further note that, in some embodiments, message 320 may be presented as a selectable hyperlink such that, when selected by the user 122, the suggested action 140 may be automatically initiated. For example, in the embodiment of FIG. 3B, message 320 may include a hyperlink that, when selected by the user 122, redirects to a webpage usable by the user 122 to verify his or her email address.

In FIG. 3B, message 330 is a message that has been generated by populating message template 310 with information associated with the selected suggested action 140. In some embodiments, message 330 may be most suitable for presentation to the user 122 in instances in which the user device 120 is a mobile computing device and the access request 130 was sent via a software application executing on the mobile device such that the message 330 may be presented as a tile element within a UI of that software application. As shown in FIG. 3B, the items of information in message 330 are depicted in different locations and different sizes relative to the same items of information in message 320. For example, in message 330, the appropriate icon has been moved to a central portion of the tile and the action name has been positioned below the icon. Additionally, note that, in various embodiments, different presentation formats for the same action may contain different sets of content, as desired. For example, in FIG. 3B, message 330 includes an action description that is shorter than the corresponding action description provided in message 320. As with message 320, in some embodiments the message 330 may include a hyperlink that is usable by the user 122 to facilitate performance of the suggested action 140, either via the server system 102 or a trusted third-party system, according to various embodiments.

Note that that message templates 300-310 and messages 320-330 in FIGS. 3A-3B are provided merely as examples and are not intended to limit the scope of the present disclosure. In other embodiments, a message template may include any suitable combination of elements. Further note that, in various embodiments, in addition to having different sizes and positions for items of information, message templates may include various other formatting differences, such as different colors or color schemes, content (e.g., different icons 302, action descriptions 306, etc.), capabilities, etc. Further note that the suggested action 140 described with reference to messages 320 and 330 is provided merely as an example and is also not intended to limit the scope of the present disclosure. In other embodiments, for example, messages 320 or 330 may be used to provide content corresponding to any suitable action that may be suggested to a user. Non-limiting examples of such actions include: "link a card," "add a photo," "turn on fingerprint ID," "add contacts," "confirm your mobile phone," "link a transaction instrument," "link a bank," etc.

Turning now to FIG. 4, a flow diagram illustrating an example method 400 for generating a real-time suggested action for a user based on current profile attributes is depicted, according to some embodiments. In various embodiments, method 400 may be performed by server system 102 of FIG. 1 to select an action to suggest for a user 122 of user device 120. For example, server system 102 may include (or have access to) a non-transitory, computer-readable medium having program instructions stored thereon that are executable by the server system to cause the operations described with reference to FIG. 4. In FIG. 4, method 400 includes elements 402-410. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, the server system accesses a set of potential actions to suggest to the user. For example, as shown with reference to FIG. 1, the suggestion module 104 may access the set of potential user actions 112 that may be suggested to the user 122 of user device 120. As noted above, in various embodiments the set of potential user actions 112 may include various operations that may be performed by or on behalf of the user 122's user account with the service provided by server system 102.

At 404, in the illustrated embodiment, the server system applies eligibility rules, based on real-time profile attributes associated with user account, to identify a subset of potential actions that are relevant to the user. For example, as shown in FIG. 2, real-time eligibility module 202 may filter the set of potential user actions 112 to identify a subset of potential actions 203 that are relevant to the user 122. As described above, real-time eligibility module 202 may identify the subset of potential actions 203 by accessing account information 108 associated with the user 122's user account. Specifically, the real-time eligibility module 202 may use profile attributes 110 associated with the user account to identify those potential actions that are most relevant to the user 122.

At 406, in the illustrated embodiment, the server system selects a particular action to suggest to the user from the subset of potential actions. For example, as shown in FIG. 2, selection module 118 may select the suggested action 140 from the subset of potential actions 203 based on their respective priority scores. As described above, these priority scores may be determined by scoring module 204 to rank the subset of potential actions 203 based on which action is estimated to be most relevant to the user 122 based on the profile attributes 110 associated with the user 122's user account.

At 408, in the illustrated embodiment, the server system selects a presentation format in which the particular action will be presented to the user. For example, in various embodiments, server system 102 may select a presentation format for the suggested action 140 based on the access method used by the user 122 to send the access request 130. At 410, in the illustrated embodiment, the server system sends a suggestion message to the user device that will enable the particular action to be suggested to the user in the selected presentation format. For example, as shown in FIG. 1, server system 102 may send a message 138 indicative of the suggested action 140 to the user device 120.

Referring now to FIG. 5, a flow diagram illustrating an example method 500 for selecting, in real-time, an updated action to suggest to a user in response to an indication that the user has initiated a previously suggested action, according to some embodiments. In various embodiments, method 500 may be performed by server system 102 of FIG. 1 to select an action to suggest for a user 122 of user device 120. For example, server system 102 may include (or have access to) a non-transitory, computer-readable medium having program instructions stored thereon that are executable by the server system to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the server system selects, in real-time, a particular action to suggest to a user, where the particular action is selected using profile attribute information associated with a user account of the user. For example, as discussed above with reference to FIG. 1, suggestion module 104 is operable to select suggested action 140 to suggest to user 122 in real-time based on profile attributes 110 associated with user 122's user account. Note that, in some embodiments, the server system 102 may receive, from the user device 120, an access request 130 to access a service provided by the server system 102. In various embodiments, element 502 may be performed in real-time in response to this access request 130.

In some embodiments, to select the particular action, the server system is operable to access profile attributes associated with the user account, where the profile attributes are updated in real-time based on activity associated with the user account. In some instances, the activity associated with the user account may be performed by the user (e.g., through using the service provided by server system 102). In other embodiments, the activity associated with the user account may be performed by one or more services on behalf of the user account. For example, in some embodiments, various services included in or accessible to the infrastructure of server system 102 may perform operations on behalf of the user account, such as verifying a mobile phone number or linking a transaction instrument to the users account. In such embodiments, these trusted services may be operable to update the profile attributes 110 for the user account in real-time.

Further, in some embodiments, selecting the particular action may include filtering a set of potential actions based on the profile attributes of the user account to identify a subset potential actions to suggest to the user. For example, as described above with reference to FIG. 2, real-time eligibility module 202, in various embodiments, is operable to identify a subset of potential actions 203, from the larger set of potential user actions 112, that are relevant to the user 122 based on the user's profile attributes 110. In some embodiments, the suggestion module 104 may further determine a priority score for each of the subset of potential actions 203. For example, some embodiments, determining the priority scores include applying a machine learning model 206 to generate propensity scores for the subset of potential actions 203. In some such embodiments, the machine learning model is an ensemble model based on a gradient-boosted decision tree. In other embodiments, however, rather than using machine learning model 206, the scoring module 204 may instead determine the priority scores for each of the subset of potential actions 203 based on assigned priority scores associated with each of these actions. For example, in some such embodiments, each of the subset of potential actions 203 is associated with an assigned priority score. In such embodiments the suggested action 140 is selected based on these assigned priority scores. Further, as noted above, in some embodiments, one or more of the subset of potential actions 203 may be associated with multiple assigned priority scores. For example, a given action may have two different assigned priority scores, one relatively high (e.g., a 0.75 on a scale from 0-1) and one relatively low (e.g., a 0.25 on a scale from 0-1). In such embodiments, the priority score used by the suggestion module 104 may be selected based on the profile attributes 110 associated with the user 122. For example, in addition to being assigned multiple priority scores, the action may additionally be assigned one or more corresponding rules (e.g., provided as a Boolean expression or in any other suitable format) that dictate the situations in which each of the assigned priority scores is to be used. In such embodiments, when determining the priority score for such an action that has multiple assigned priority scores, the selection module 118 may evaluate the assigned one or more corresponding rules based on the profile attributes 110 associated with the user account to select the appropriate priority score for the user 122.

At 504, in the illustrated embodiment, the server system provides the particular action to a user device associated with the user. For example, as described above with reference to FIG. 1, after selecting suggested action 140, the server system 102 may provide the suggested action 140 as part of a message 138 that is sent to the user device 120. In some embodiments, method 500 may include selecting a corresponding presentation format for the suggested action 140 based on an access method used to send the access request 130. In some such embodiments, providing the particular action to the user device includes sending the message 138 indicative of the suggested action 140 to the user device 120 such that, when presented via the user device 120, the message 138 is depicted based on the corresponding presentation format. For example, in some embodiments, the user device 120 is a mobile communication device, such as a smart phone or tablet computer. In such embodiments, the access request 130 may indicate that a software application executing on the mobile communication device was used as the access method to send the access request 130.

At 506, in the illustrated embodiment, the server system may receive an indication that the user has initiated the particular action. For example, as shown in FIG. 1, server system 102 may include activity tracking module 114, which may be operable to monitor activity associated with the user account of the user 122. If the user 122 elects to initiate the suggested action 140, the activity tracking module 114 may detect this and provide appropriate updates to the profile attributes 110 associated with the user 122's user account. For example, at 508, in the illustrated embodiment, the server system may update profile attributes associated with the user account to generate updated profile attributes. In various embodiments, the updated profile attributes may indicate that the user has initiated the particular action. For example, upon receiving an indication that the user has initiated the particular action at element 506, the activity tracking module 114 may update the profile attributes 110 stored in data store 106.

At 510, in the illustrated embodiment, the server system may select, in real-time, and updated action to suggest to the user based on the updated profile attributes. For example, in response to receiving the indication that the user has initiated the suggested action 140, the suggestion module may then select a new action to suggest to the user 122. Note that, in various embodiments, the new action suggested to the user will be different than the suggested action 140 previously provided to the user 122.

Note that, in some embodiments, providing the particular action to the user device associated with the user at element 504 may include providing multiple potential actions to the user device such that, when depicted via the user device 120, the plurality of potential actions are presented in positions based on their corresponding priority scores. For example, in some embodiments, suggestion module 104 may select multiple actions to suggest simultaneously to the user 122. As one non-limiting example, suggestion module 104 may select the top three potential actions, as indicated by the respective priority scores, to suggest to the user 122. In some such embodiments, providing these multiple suggested actions to the user may include formatting the message such that when these suggested actions are presented to the user, the prominence in which they are displayed is dependent on their priority scores. For example, the suggested action with the highest priority score may be displayed in the most prominent position within the user interface of the user device 120. Similarly, the suggested action with the lowest priority score may be displayed in the least prominent position available within the user interface of the user device 120.

Example Computer System

Figure 6:
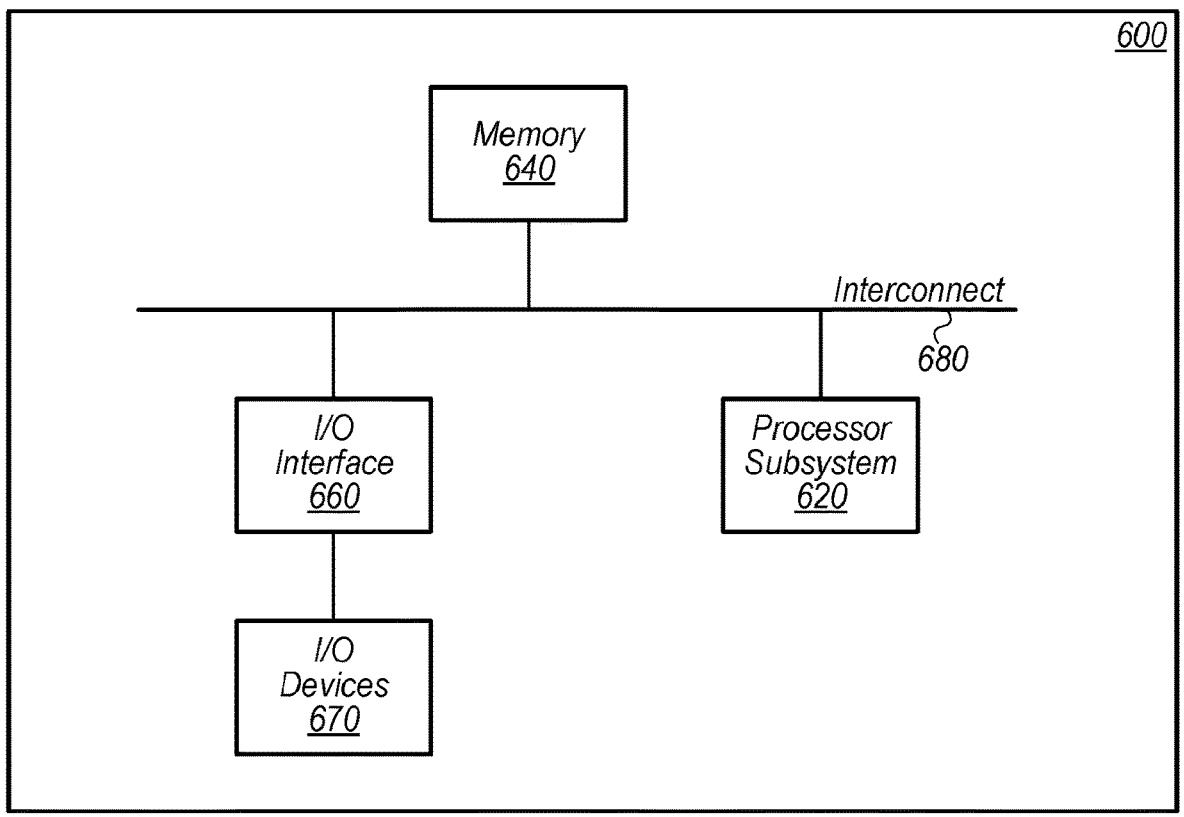
FIG. 6 is a block diagram illustrating an example computer system, according to some embodiments.

Referring now to FIG. 6, a block diagram of an example computer system 600 is depicted, which may implement one or more computer systems, such as a computer system used to implement server system 102 of FIG. 1, according to various embodiments. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 600 is shown in FIG. 6 for convenience, computer system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable to store program instructions executable by processor subsystem 620 to cause system 600 perform various operations described herein. System memory 640 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as system memory 640. Rather, computer system 600 may also include other forms of storage such as cache memory in processor subsystem 620 and secondary storage on I/O devices 670 (e.g., a hard drive, storage array, etc.). In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 670 includes a network interface device (e.g., configured to communicate over WiFi, Bluetooth, Ethernet, etc.), and computer system 600 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents, and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., suggestion module 104, scoring module 204, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:
1. A method, comprising:
 using, by a computer system in an online payment service, a machine learning model to analyze online actions taken by a particular user associated with a particular account of the online payment service;

receiving, by the computer system from a user device, an access request associated with the particular account; and in response to the access request:
  predicting, by the computer system, a next action to be taken by the particular user, wherein the predicting includes:
    based on the analyzed online actions of the particular user, updating one or more profile attributes associated with the particular account;
    determining priority scores for a plurality of potential next actions based on the one or more updated profile attributes; and
    selecting, based on the determined priority scores, at least one of the potential next actions as a predicted next action;
  sending, by the computer system, the predicted next action to the user device;
  in response to an indication of a selection of a next action by the particular user, predicting, by the computer system based on the selection of the next action, a subsequent action to be taken by the particular user; and
  sending, by the computer system, the predicted subsequent action to the user device.

2. The method of claim 1, wherein determining the priority scores for the plurality of potential next actions includes identifying one or more actions specified in the particular account of the particular user.

3. The method of claim 1, wherein determining the priority scores for the plurality of potential next actions includes identifying one or more actions that are capable of being performed by the online payment service for the particular user.

4. The method of claim 1, wherein determining the priority scores for the plurality of potential next actions includes identifying one or more actions that are eligible to be performed for the particular user.

5. The method of claim 1, wherein updating the one or more profile attributes is performed in real-time.

6. The method of claim 1, further comprising updating, by the computer system using an updated machine learning model analysis, the one or more profile attributes associated with the particular account of the particular user.

7. The method of claim 1, further comprising:
receiving, by the computer system from a third-party service, information regarding a subset of the online actions taken by the particular user; and
updating, by the computer system using the received information, the one or more profile attributes associated with the particular account of the particular user.

8. The method of claim 1, further comprising, in response to the indication of the selection of the next action, predicting, by the computer system, that the predicted subsequent action to be taken by the particular user is the same as the predicted next action.

9. A non-transitory, computer-readable medium having instructions stored thereon that are executable by a computer system, of an online payment service, to perform operations comprising:
analyzing, using a machine learning model, online activity of a of a particular user;
using the analyzed online activity to modify profile attributes in a particular account associated with the particular user;
after granting access to an account of the particular user, receiving an indication of a selection of a particular action by the particular user;
analyzing, using the machine learning model, the particular action of the particular user, wherein an analysis of the particular action is added to the analyzed online activity;
updating, based on the analyzed particular action, respective profile attributes in the account of the particular user;
determining priority scores for a plurality of potential next actions using the updated profile attributes in the particular account of the particular user;
predicting, based on the determined priority scores, that a particular one of the plurality of potential next actions will be taken by the particular user;
generate a message for a device of the particular user, the message including the predicted next action; and
in response to an indication of a selection of a next action by the particular user, repeat the updating of the respective profile attributes in the account of the particular user.

10. The non-transitory, computer-readable medium of claim 9, wherein determining the priority scores for the plurality of potential next actions includes identifying one or more actions that are eligible to be performed for the particular user.

11. The non-transitory, computer-readable medium of claim 10, wherein the actions include sending money to a contact associated with the particular user.

12. The non-transitory, computer-readable medium of claim 10, wherein the actions include linking a financial transaction instrument to an account of the particular user.

13. The non-transitory, computer-readable medium of claim 9, wherein generating the message for the device of the particular user includes selecting a particular presentation format from a plurality of presentation formats.

14. The non-transitory, computer-readable medium of claim 13, further comprising selecting the particular presentation format based on a type of the device used by the particular user to access the online payment service.

15. A system, comprising:
a non-transitory memory storing instructions; and
a processor configured to execute the instructions to cause the system to:
  cause a machine learning model to analyze activity of a particular user;
  update one or more profile attributes in an account of the particular user, wherein the update to the one or more profile attributes are based on the analyzed activity;
  receive, from a device of the particular user, an account access request;
  in response to an indication of additional activity by the particular user, cause the machine learning model to update the analyzed activity;
  use the updated analyzed activity to modify the one or more profile attributes;
  determine respective priority scores for a plurality of potential next actions based on the updated profile attributes;
  based on the determined priority scores, predict that a particular one of the plurality of potential next actions will be taken by the particular user;
  send the predicted next action to the device of the particular user; and in response to an indication of a selection of a next action by the particular user, cause the machine learning model to update the analyzed activity.

16. The system of claim 15, wherein to determine the respective priority scores, the processor is further configured to:
   select one or more actions previously identified by the particular user; and
   determine respective priority scores for the selected actions.

17. The system of claim 15, wherein the processor is further configured to:
   associate ones of the plurality of potential next actions with a respective eligibility rule; and
   select a subset of the plurality of potential next actions using the respective eligibility rules.

18. The system of claim 17, wherein to select the subset of the plurality of potential next actions, the processor is further configured, for ones of the plurality of potential next actions, to compare the respective eligibility rule to current values of the one or more profile attributes.

19. The system of claim 15, wherein the plurality of potential next actions includes confirming user contact information.

20. The system of claim 15, wherein the plurality of potential next actions includes linking a bank account to an account of the particular user.

\* \* \* \* \*